US012683795B2

(12) United States Patent
Rodriguez

(10) Patent No.: US 12,683,795 B2
(45) Date of Patent: Jul. 14, 2026

(54) METHODS AND SYSTEMS FOR ENHANCING THE SECURITY OF VOICE BIOMETRIC DATA

(71) Applicant: Daon Technology, Douglas (IM)

(72) Inventor: Raphael A. Rodriguez, Marco Island, FL (US)

(73) Assignee: Daon Technology, Douglas (IM)

( * ) Notice: Subject to any disclaimer, the term of this patent is extended or adjusted under 35 U.S.C. 154(b) by 0 days.

(21) Appl. No.: 18/786,786

(22) Filed: Jul. 29, 2024

(65) Prior Publication Data

US 2026/0031996 A1 Jan. 29, 2026

(51) Int. Cl.
*H04L 9/32* (2006.01)
*H04L 9/00* (2022.01)
(52) U.S. Cl.
CPC .......... *H04L 9/3231* (2013.01); *H04L 9/3236* (2013.01); *H04L 9/50* (2022.05)
(58) Field of Classification Search
CPC ........ H04L 9/3231; H04L 9/3236; H04L 9/50
See application file for complete search history.

(56) References Cited

U.S. PATENT DOCUMENTS

| | | | | |
|---|---|---|---|---|
| 10,547,738 B1 * | 1/2020 | Anders | ................. | H04M 1/571 |
| 11,915,808 B1 * | 2/2024 | Uribe | ................. | G06Q 20/3674 |
| 12,217,762 B1 * | 2/2025 | Shyrman | ................. | G10L 25/30 |
| 2020/0122046 A1 * | 4/2020 | Nocon | ................. | G06F 16/683 |
| 2021/0193174 A1 * | 6/2021 | Enzinger | ................. | G10L 17/00 |
| 2021/0407532 A1 * | 12/2021 | Salahuddin | .......... | A61B 5/4812 |
| 2022/0029981 A1 * | 1/2022 | Mavani | ............... | H04L 63/0861 |
| 2023/0010140 A1 * | 1/2023 | Gonzalez-Gasque | ....................... | G06Q 10/40 |
| 2023/0112507 A1 * | 4/2023 | Petersen | ................. | H04L 63/10 713/186 |
| 2023/0254650 A1 * | 8/2023 | Lovchinsky | ............ | G10L 25/78 |
| 2023/0403144 A1 * | 12/2023 | Rhodin | ................. | H04L 9/3239 |
| 2025/0022472 A1 * | 1/2025 | Blouet | ................. | G10L 13/02 |
| 2025/0029601 A1 * | 1/2025 | Rahman | ................. | G10L 17/08 |
| 2025/0029614 A1 * | 1/2025 | Looney | ................. | G10L 19/018 |

* cited by examiner

*Primary Examiner* — Blake I Narramore
(74) *Attorney, Agent, or Firm* — Kevin McDermott, Esq.

(57) ABSTRACT

A method for enhancing the security of voice biometric data is provided that includes receiving, by an electronic device, voice biometric data of a user captured while the user was speaking and analyzing the context in which the received voice biometric data was captured. The context includes environmental and situational factors. The method also includes analyzing characteristics of the received voice biometric data to detect anomalies associated with synthetic speech, and conducting a biometric authentication transaction based on the voice biometric data in response to determining the received voice biometric data is free of anomalies. In response to successfully authenticating the user, the method includes updating record voice biometric data of the user with the received voice biometric data. Moreover, the method includes modifying the updated record voice biometric data and securely storing the modified updated record voice biometric data.

20 Claims, 5 Drawing Sheets

100

METHODS AND SYSTEMS FOR ENHANCING THE SECURITY OF VOICE BIOMETRIC DATA

BACKGROUND OF THE INVENTION

This invention relates generally to voice biometric data, and more particularly, to methods and systems for enhancing the security of voice biometric data.

Voice biometric authentication systems may be deployed in call centers to conveniently and efficiently authenticate callers. Voice biometric data obtained during an enrollment process is typically stored in the system in a data record for each respective person. However, the data records typically do not change. As a result, known voice biometric systems typically do not adapt to changes in a person's voice over time. The data records are thus typically static.

Factors such as aging, illness, emotional state, and environmental conditions can affect a person's voice, potentially leading to increased false rejection rates and decreased satisfaction, which may lead to a lower Net Promoter Score (NPS) for large enterprises servicing global consumers. A lower NPS may negatively impact the brand of such enterprises. The inability of these systems to adapt to changes in a person's voice makes them increasingly susceptible to synthetic voice and deep fake attacks, which can exploit the static nature of the voice biometric data to conduct fraudulent authentication transactions.

Imposters have been known to use synthetic voice technologies to generate synthetic voice data that mimics a person's record voice biometric data for use in gaining unauthorized access to the person's information. Known detection algorithm and security protocol development has not been able to match evolution of such synthetic voice technologies. Security measures like those implemented by known voice authentication systems typically do not adequately protect record voice biometric data against unauthorized access and tampering. As a result, voice biometric data may be stolen or manipulated which would compromise the integrity of the biometric system and expose users to potential fraud. Consequently, there is a need for more advanced security mechanisms that can detect synthetic voice data and adapt to the evolving sophistication of synthetic speech technologies.

Thus, it would be advantageous and an improvement over the relevant technology to provide a method and a system capable of enhancing the security of record voice biometric data used by and stored in a voice biometric authentication system.

BRIEF DESCRIPTION OF THE INVENTION

An aspect of the present disclosure provides a method for enhancing the security of voice biometric data including the steps of receiving, by an electronic device, voice biometric data of a user captured while the user was speaking and analyzing the context in which the received voice biometric data was captured. The context includes environmental and situational factors. Moreover, the method includes the steps of analyzing characteristics of the received voice biometric data to detect anomalies associated with synthetic speech. In response to determining the received voice biometric data is free of anomalies, the method includes conducting a biometric authentication transaction based on the voice biometric data. In response to successfully authenticating the user, the method includes updating record voice biometric data of the user with the received voice biometric data, modifying the updated record voice biometric data, and securely storing the modified updated record voice biometric data.

In an embodiment of the present disclosure, the securely storing step includes calculating a cryptographic hash for the modified updated voice biometric data to uniquely identify the modified updated voice biometric data and prevent unauthorized alterations, and recording the modified updated voice biometric data in a tamper-proof ledger using blockchain technology.

In another embodiment of the present disclosure, the method includes updating an anomaly detection algorithm used to analyze the characteristics of the received voice biometric data and updating a voice biometric data updating algorithm.

In yet another embodiment of the present disclosure, the anomalies include inconsistencies in the range of pitch, timbre, intensity, prosody, and pace, rhythm, and nature of speech.

In yet another embodiment of the present disclosure, the method includes the steps of receiving additional authentication data associated with the user, analyzing characteristics of the additional authentication data to detect anomalies associated with synthetic speech, and in response to determining the received voice biometric data is free of anomalies conducting an authentication transaction based on the additional authentication data.

In yet another embodiment of the present disclosure, the step of modifying the updated voice biometric data includes altering the frequency modulation of the updated voice biometric data, randomly altering inflection points and words in the updated voice biometric data, and intermittingly introducing background noise, wherein the background noise varies in type and intensity.

In yet another embodiment of the present disclosure, the method further includes developing adaptive thresholds for determining authenticity of the received voice data based on the context in which the received voice biometric data was captured and record data of the user.

Yet another aspect of the present disclosure provides a non-transitory computer-readable recording medium in an electronic device for enhancing the security of voice biometric data.

Yet another aspect of the present disclosure provides an electronic device for enhancing the security of voice biometric data including a processor and a memory configured to store data. The electronic device is associated with a network and the memory is in communication with the processor and has instructions stored thereon which, when read and executed by the processor, cause the electronic device to receive voice biometric data of a user captured while the user was speaking and analyze the context in which the received voice biometric data was captured. The context includes environmental and situational factors. Moreover, the instructions, when read and executed by the processor, cause the electronic device to analyze characteristics of the received voice biometric data to detect anomalies associated with synthetic speech. In response to determining the received voice biometric data is free of anomalies, the instructions, when read and executed by the processor, cause the electronic device to conduct a biometric authentication transaction based on the voice biometric data. In response to successfully authenticating the user, the instructions, when read and executed by the processor, cause the electronic device to update record voice biometric data of the user with the received voice biometric data, modify the updated record voice biometric data, and securely store the updated record voice biometric data.

In an embodiment of the present disclosure the instructions, when read and executed by the processor, cause the electronic device to calculate a cryptographic hash for the modified updated voice biometric data to uniquely identify the modified updated voice biometric data and prevent unauthorized alterations, and record the modified updated voice biometric data in a tamper-proof ledger using blockchain technology.

In another embodiment of the present disclosure the instructions, when read and executed by the processor, cause the electronic device to update an anomaly detection algorithm used to analyze characteristics of the received voice biometric data, and update a voice biometric data updating algorithm.

In yet another embodiment of the present disclosure the anomalies include inconsistencies in the range of pitch, timbre, intensity, prosody, and pace, rhythm, and nature of speech.

In yet another embodiment of the present disclosure the instructions, when read and executed by the processor, cause the electronic device to receive additional authentication data associated with the user, analyze characteristics of the additional authentication data to detect anomalies associated with synthetic speech, and in response to determining the received voice biometric data is free of anomalies, conduct an authentication transaction based on the additional authentication data.

In yet another embodiment of the present disclosure the instructions, when read and executed by the processor, cause the electronic device to alter the frequency modulation of the updated voice biometric data, randomly alter inflection points and words in the updated voice biometric data, and intermittingly introduce background noise, wherein the background noise varies in type and intensity.

In yet another embodiment of the present disclosure the instructions, when read and executed by the processor, cause the electronic device to develop adaptive thresholds for determining authenticity of the received voice data based on the context in which the received voice biometric data was captured and record data of the user.

DETAILED DESCRIPTION OF THE INVENTION

The following detailed description is made with reference to the accompanying drawings and is provided to assist in a comprehensive understanding of various example embodiments of the present disclosure. The following description includes various details to assist in that understanding, but these are to be regarded merely as examples and not for the purpose of limiting the present disclosure as defined by the appended claims and their equivalents. The words and phrases used in the following description are merely used to enable a clear and consistent understanding of the present disclosure. In addition, descriptions of well-known structures, functions, and configurations may have been omitted for clarity and conciseness. Those of ordinary skill in the art will recognize that various changes and modifications of the example embodiments described herein can be made without departing from the spirit and scope of the present disclosure.

Figure 1:
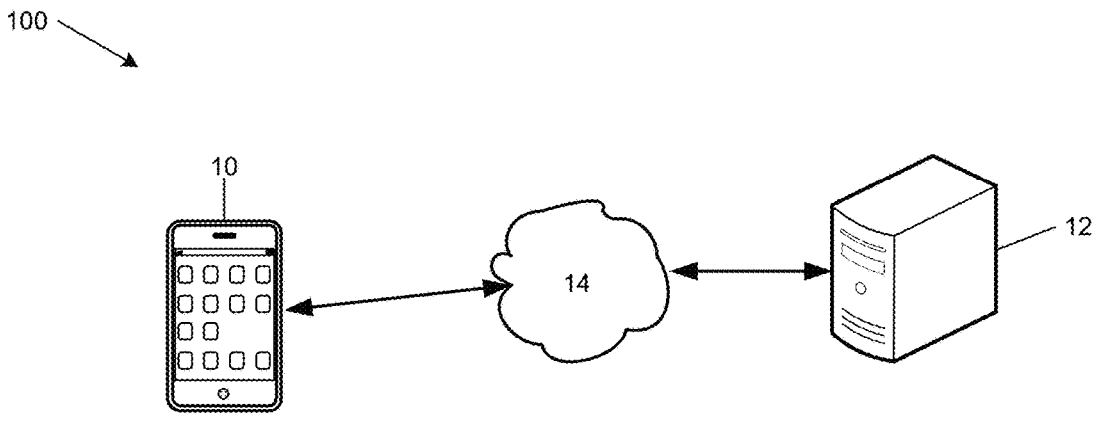
FIG. 1 is a schematic diagram of an example computing system for enhancing the security of voice biometric data according to an embodiment of the present disclosure.

FIG. 1 is a schematic diagram of an example computing system 100 for enhancing the security of voice biometric data according to an embodiment of the present disclosure. As shown in FIG. 1, the main elements of the system 100 include an electronic device 10 and a server 12 communicatively connected via a network 14.

In FIG. 1, the electronic device 10 can be any electronic device capable of at least downloading applications over the Internet, running applications, capturing and storing data temporarily and/or permanently, and otherwise performing any and all functions, methods and/or algorithms described herein by any computer, computer system, server or electronic device included in the system 100. Moreover, the electronic device 10 may alternatively be any type of server or computer implemented as a network server or network computer. Other examples of the electronic device 10 include, but are not limited to, a cellular phone, any wireless hand-held consumer electronic device, a smart phone, a tablet computer, a phablet computer, a laptop computer, and a personal computer (PC).

The electronic device 10 may be associated with a single person who operates the device. The person who is associated with and operates the electronic device 10 may be referred to herein as a user. Additionally, a user may be any person being authenticated, for example, during an authentication transaction.

The server 12 can be, for example, any type of server or computer implemented as a network server or network computer. The electronic device 10 and server 12 may alternatively be referred to as information systems. The server 12 may also alternatively be referred to as an electronic device.

The network 14 may be implemented as a 5G communications network. Alternatively, the network 14 may be implemented as any wireless network including, but not limited to, 4G, 3G, Wi-Fi, Global System for Mobile (GSM), Enhanced Data for GSM Evolution (EDGE), and any combination of a LAN, a wide area network (WAN) and the Internet. The network 14 may also be any type of wired network or a combination of wired and wireless networks.

It is contemplated by the present disclosure that the number of electronic devices 10 and servers 12 is not limited to the number shown in the system 100. Rather, any number of electronic devices 10 and servers 12 may be included in the system 100.

Figure 2:
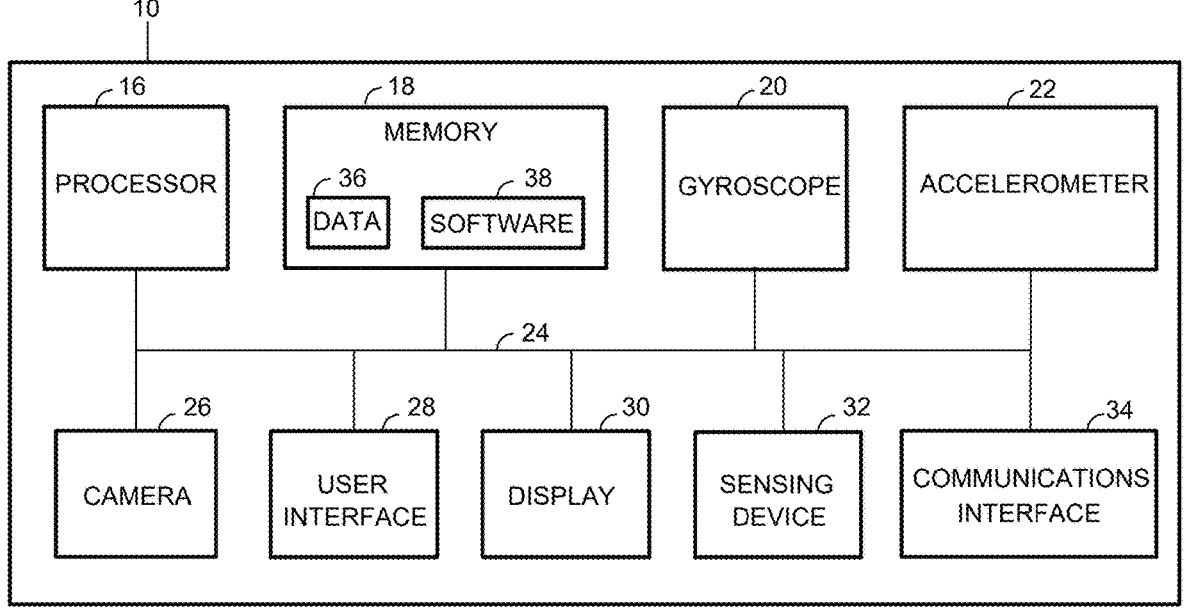
FIG. 2 is a more detailed schematic diagram illustrating an example electronic device in the system of FIG. 1.

FIG. 2 is a more detailed schematic diagram illustrating the example electronic device 10 used for enhancing the security of voice biometric data according to an embodiment of the present disclosure. The electronic device 10 includes components such as, but not limited to, one or more processors 16, a memory 18, a gyroscope 20, one or more accelerometers 22, a bus 24, a camera 26, a user interface 28, a display 30, a sensing device 32 and a communications interface 34. General communication between the components in the electronic device 10 is provided via the bus 24.

In FIG. 2, the electronic device 10 can be any electronic device capable of at least downloading applications over the Internet, running applications, capturing and storing data temporarily and/or permanently, and otherwise performing any and all functions, methods and/or algorithms described herein by any computer, computer system, server or electronic device that capable of communicating with the electronic device 10. For example, the electronic device 10 may be any type of server or computer implemented as a network server or network computer. Other examples of the electronic device 10 include, but are not limited to, a cellular phone, any wireless hand-held consumer electronic device, a smart phone, a tablet computer, a phablet computer, a laptop computer, and a personal computer (PC). It is contemplated by the present disclosure that the electronic device 10 may not include some components, for example, the gyroscope 20 and accelerometer 22 in some embodiments.

The processor 16 executes software instructions, or computer programs, stored in the memory 18. As used herein, the term processor is not limited to just those integrated circuits referred to in the art as a processor, but broadly refers to a computer, a microcontroller, a microcomputer, a programmable logic controller, an application specific integrated circuit, and any other programmable circuit capable of executing at least a portion of the functions and/or methods described herein. The above examples are not intended to limit in any way the definition and/or meaning of the term "processor."

The memory 18 may be any non-transitory computer-readable recording medium. Non-transitory computer-readable recording media may be any tangible computer-based device implemented in any method or technology for short-term and long-term storage of information or data. Moreover, the non-transitory computer-readable recording media may be implemented using any appropriate combination of alterable, volatile or non-volatile memory or non-alterable, or fixed, memory. The alterable memory, whether volatile or non-volatile, can be implemented using any one or more of static or dynamic RAM (Random Access Memory), a floppy disc and disc drive, a writeable or re-writeable optical disc and disc drive, a hard drive, flash memory or the like. Similarly, the non-alterable or fixed memory can be implemented using any one or more of ROM (Read-Only Memory), PROM (Programmable Read-Only Memory), EPROM (Erasable Programmable Read-Only Memory), EEPROM (Electrically Erasable Programmable Read-Only Memory), and disc drive or the like. Furthermore, the non-transitory computer-readable recording media may be implemented as smart cards, SIMs, any type of physical and/or virtual storage, or any other digital source such as a network or the Internet from which computer programs, applications or executable instructions can be read.

The memory 18 may be used to store any type of data 36, for example, data records of users. Each data record is typically for a respective user. The data record for each user may include data such as, but not limited to, data captured during authentication transactions, biometric templates, personal data, and authentication transaction results. Data captured during authentication transactions may include, but is not limited to, biometric modality data, pass-phrases, randomly chosen words or phrases, personal identification numbers, answers to security questions, and data regarding the context in which the biometric modality data was captured. Voice biometric data for each user may be analyzed to determine typical speech patterns for the respective user and for training machine learning models.

A biometric template can be any type of mathematical representation of biometric modality data. Biometric modality data is the data of a biometric modality of a person. Example biometric modalities include, but are not limited to, voice, face, palm, and fingerprint. Biometric data may also include data regarding the behavior of a person combining cognition and executive motor control, for example, typing on a keyboard or maneuvering a mouse. Different types of authentication data, for example, knowledge-based factors may be used in addition to or instead of biometric modality data to authenticate a user. Examples of knowledge-based factors include, but are not limited to, passwords and security questions.

It is contemplated by the present disclosure that record voice biometric data and biometric templates may alternatively be divided into different components. Each component may be processed and stored separately in the same device, for example, the electronic device 10 or may be stored amongst a plurality of devices, for example, the electronic device 10 and the server 12. Storing the components separately facilitates reducing the risks that the record voice biometric data of any person would be copied using Artificial Intelligence (AI) techniques.

Voice biometric data may be captured by the electronic device 10 by recording a user speaking a phrase. The phrase may be secret. Captured voice biometric data may be temporarily or permanently stored in the electronic device 10 or in any device capable of communicating with the electronic device 10 via the network 14. Voice biometric data is captured as audio data. Audio signals are audio data. The audio data is stored as an audio data file. As used herein, capture means to record temporarily or permanently, any data including, for example, voice biometric data of a user while speaking. Captured voice biometric data and biometric templates stored in the memory 18 may be referred to as record voice biometric data. Voice biometric data may alternatively be referred to herein as speech. Similarly, speech may alternatively be referred to herein as voice biometric data.

Record voice biometric data of a person may be updated to reflect additional voice biometric data captured from that person during, for example, an authentication transaction. The record voice biometric data may be combined with the additional voice biometric data to update the record voice biometric data. For example, features may be extracted from the record and additional voice biometric data. Features include, but are not limited to, pitch, timbre, intensity, prosody and other relevant characteristics. The extracted features may be normalized and weights may be assigned to each feature based on the recency and reliability of the respective feature. For instance, more recent and higher reliability features may be assigned higher weights. The features may be combined by calculating a weighted average for each feature, for example, according to the equation $((w_1)(feature_1)+(w_2)(feature_2))/(w_1+W_2)$, where $w_1$ and $w_2$ are the weights assigned to $feature_1$ and $feature_2$, respectively, and $feature_1$ is the feature from the record voice biometric data and $feature_2$ is the feature from the additional voice biometric data.

The time frames of the record and additional voice biometric data may be aligned and averaged to integrate temporal characteristics. Additionally, a harmonic and spectral analysis may be performed on the record and additional voice biometric data, and the results can be combined to create a more detailed spectral profile. The harmonic and spectral analysis may involve averaging the power spectra of both samples. For each frequency band, a combined spectral feature may be computed using a weighted average method similar to that described herein for combining features. The combined features, spectral profile and related information may be used to update the record voice biometric data. The updated record voice biometric data can be compared against other record voice biometric data of the person to ensure the updated record voice biometric data is accurate. Alternatively, or additionally, biometric templates created from the updated record voice biometric data and other record voice biometric data may be compared against each other to ensure the updated record voice biometric data is accurate.

Record voice biometric data may be updated after each authentication transaction or after any number of authentication transactions. Doing so facilitates increasing the difficulty of generating synthetic or deep fake voice data that accurately impersonates a user's unique vocal attributes. The record voice biometric data may be locked using, for example, encryption, access control protocols and tamper-proof storage solutions or other security protocols that ensure the integrity and confidentiality of the record voice biometric data. The record voice biometric data may be encrypted using cryptographic algorithms. Access control protocols manage access to encrypted record voice biometric data.

After updating, but before storing the voice biometric data record, the voice biometric data may be modified, for example, by altering the frequency modulation of the updated record voice biometric data, randomly altering inflection points and words in the updated record voice biometric data, and intermittently introducing background noise in the updated record voice biometric data.

Updating the record voice biometric data after each authentication transaction and locking the updated record voice biometric data facilitates creating dynamically evolving and more complex record voice biometric data that is increasingly difficult to impersonate using synthetic or cloned voice data. Moreover, updating the record voice biometric data ensures that the record voice biometric data remains current and more accurately reflects the user's voice, which should facilitate reducing false rejections.

The memory 18 may be considered a database. It is contemplated by the present disclosure that the database may alternatively be implemented as a decentralized database employing blockchain technology. More specifically, voice biometric data received by the electronic device 10 may be record in a tamper-proof ledger using blockchain technology, which enhances the integrity of voice biometric data by creating a decentralized and immutable record of each voice biometric data entry. Prior to recording the voice biometric data, a cryptographic hash can be calculated for the voice biometric data which uniquely identifies the voice biometric data and facilitates preventing unauthorized alterations. Moreover, each voice biometric data entry may be validated against previous voice biometric data entries to ensure the voice biometric data is authentic. Using blockchain technology provides an auditable trail of all voice biometric data entries to enhance transparency and security.

The block chain ledger may create a new block for each authentication transaction and encapsulate the voice biometric data, a timestamp indicating the time the voice biometric data was captured, and authentication metadata included in the voice biometric data. Each new block may be linked to the previous block using cryptographic hashes to facilitate ensuring the immutability of the record voice biometric data.

Moreover, copies of the blockchain ledger may be distributed across multiple nodes in a decentralized network to enhance security and prevent unauthorized tampering.

The integrity of the voice biometric data captured during an authentication transaction may be verified by comparing the stored cryptographic hashes against recalculated hashes during each subsequent interaction. For example, during an authentication transaction voice biometric data may be captured from a person and a hash calculated using the same cryptographic algorithm used in previous authentication transactions involving that person. The stored hashed voice biometric data can be retrieved from the blockchain ledger corresponding to the most recent previous authentication transaction. The stored and calculated hashed voice biometric data may be compared against each other for consistency. When the hashes match, the captured voice biometric data is considered consistent with the retrieved voice biometric data, indicating that the captured voice biometric data has not been tampered with. However, when the hashes fail to match the captured voice biometric data may contain discrepancies indicative of anomalies. As a result, manual security checks may be implemented.

The term "personal data" as used herein includes any demographic information regarding a user as well as contact information pertinent to the user. Such demographic information includes, but is not limited to, a user's name, age, date of birth, street address, email address, citizenship, marital status, and contact information. Contact information can include devices and methods for contacting the user.

Additionally, the memory 18 can be used to store any type of software 38. As used herein, the term "software" is intended to encompass an executable computer program that exists permanently or temporarily on any non-transitory computer-readable recordable medium that causes the electronic device 10 to perform at least a portion of the functions, methods, and/or algorithms described herein. Application programs are software and include, but are not limited to, operating systems, Internet browser applications, authentication applications, machine learning algorithms (MLA), trained machine learning models, anomaly detection algorithms, voice biometric data updating algorithms, and any other software and/or any type of instructions associated with algorithms, processes, or operations for controlling the general functions and operations of the electronic device 10. The software may also include computer programs that implement buffers and use RAM to store temporary data.

Authentication applications enable the electronic device 10 to conduct user authentication and identification (1:N) transactions with any type of authentication data, where "N" is a number of candidates.

A machine learning algorithm (MLA) may be trained to create a machine learning model for analyzing voice biometric data for characteristics typical of synthetic speech and analyzing various speech characteristics of captured voice biometric data. Machine learning models have parameters which are modified during training to optimize functionality of the models trained using a machine learning algorithm (MLA). The machine learning model may be retrained using data captured during authentication transactions. MLAs include at least classifiers and regressors. Example classifiers include, but are not limited to, Deep Neural Networks (DNNs), Time Delay Neural Networks (TDNNs), Recurrent Neural Networks (RNNs), Residual Networks (ResNets), Generative Adversarial Networks (GANs), Support Vector Machines (SVMs), Decision Trees, Random Forests, Gradient Boosting Machines (GBMs), Convolutional Neural Networks (CNNs), Long Short-Term Memory Networks (LSTMs), Transformer Networks, Naive Bayes Classifiers, k-Nearest Neighbors (k-NN), XGBoost, AdaBoost, and Multilayer Perceptrons (MLPs).

Anomaly detection algorithms may be used to scan captured voice biometric data for signs of manipulation or synthetic qualities before updating the record voice biometric data of a user. Features such as irregular speech patterns, unusual prosody, and spectral discrepancies typical of synthetic voices are analyzed to detect anomalies. If an anomaly is detected, manual review of the transaction in which the voice biometric data was captured may be warranted.

Data generated during authentication transactions may be used to update detection algorithms. Updating an anomaly detection algorithm can include several steps, including for example, collecting new voice biometric data from authenticated transactions and flagged anomalies, training the anomaly detection algorithm using machine learning techniques to improve its accuracy in identifying synthetic speech characteristics, and validating the updated algorithm through a series of tests using both genuine and synthetic voice samples to ensure its efficacy.

Additionally, deploying the updated algorithm into an electronic device included in the system 100 can enhance real-time anomaly detection capabilities. Doing so may also include updating the voice biometric data updating algorithm to ensure continuous improvement and robustness against synthetic voice attacks.

The updates can be initiated based on, for example, an analysis of performance metrics, including, for example, detection accuracy and false positive rates. Additionally, updates can be initiated based on, for example, integration of new data from authentication transactions to refine detection capabilities, and incorporation of external threat intelligence data to adapt to evolving synthetic speech techniques.

Updating a voice biometric data updating algorithm can include, for example, incorporating user feedback and authentication transaction results to refine the algorithm, adjusting parameters of the algorithm to accommodate changes in voice characteristics over time, and ensuring the updated algorithm maintains a high level of security and accuracy in updating.

The updates for updating a voice biometric data updating algorithm can include, for example, adjusting the algorithm to improve the integration of new voice biometric data with existing record voice biometric data, enhancing the algorithm's ability to detect and mitigate potential anomalies in the updated data, verifying the integrity and consistency of the updated voice biometric data against historical patterns and benchmarks, and performing validation and testing of the updated algorithms to ensure enhanced accuracy and security in detecting anomalies associated with synthetic speech.

Data generated during updates, but is not limited to, feedback on detection accuracy, including false positive and false negative results. Refining algorithms in this manner enhances security against evolving synthetic voice threats.

Voice biometric data updating algorithms analyze voice biometric data captured, for example, during authentication transactions and update the existing record voice biometric data of a user to reflect any changes in the vocal attributes of the user.

The process of verifying the identity of a user is known as an authentication transaction. Typically, during an authentication transaction based on voice biometric data, an authentication template is generated from a word, a series of words, or phrase spoken during the transaction. The authentication template is compared against a corresponding record enrolment template of the user and a score is calculated for the comparison. The record enrolment template is created during enrolment of the user in an authentication system. If the calculated score is at least equal to a threshold value, the identity of the user is authenticated as true. Alternatively, the captured voice biometric data may be compared against the corresponding record voice biometric data to verify the identity of the user.

The gyroscope 20 and the one or more accelerometers 22 generate data regarding rotation and translation of the electronic device 10 that may be communicated to the processor 16 and the memory 18 via the bus 24. The gyroscope 20 and accelerometer 22 are typically included in electronic devices 10 that are primarily mobile, for example, smart phones and other smart devices, but not in electronic devices 10 that are primarily stationary, for example, servers or personal computers. Thus, the electronic device 10 may alternatively not include the gyroscope 20 or the accelerometer 22 or may not include either.

The camera 26 captures image data. The camera 26 may be integrated into the electronic device 10 as one or more front-facing cameras and/or one or more rear facing cameras that each incorporates a sensor, for example and without limitation, a CCD or CMOS sensor.

The user interface 28 and the display 30 allow interaction between a user and the electronic device 10. The display 30 may include a visual display or monitor that displays information. For example, the display 30 may be a Liquid Crystal Display (LCD), an active-matrix display, plasma display, or cathode ray tube (CRT). The user interface 28 may include a keypad, a camera, a keyboard, a mouse, an illuminator, a signal emitter, at least one microphone, for example, dual microphones, and/or speakers. The microphone may be used to capture voice biometric data of a user while speaking during, for example, an authentication transaction.

Moreover, the user interface 28 and the display 30 may be integrated into a touch screen display. Accordingly, the display may also be used to show a graphical user interface, which can display various data and provide "forms" that include fields that allow for the entry of information by the user. Touching the screen at locations corresponding to the display of a graphical user interface allows the person to interact with the electronic device 10 to enter data, change settings, control functions, etc. Consequently, when the touch screen is touched, the user interface 28 communicates this change to the processor 16 and settings can be changed, or user entered information can be captured and stored in the memory 18.

The sensing device 32 may include Radio Frequency Identification (RFID) components or systems for receiving information from other devices (not shown) and for transmitting information to other devices. The sensing device 32 may alternatively, or additionally, include components with Bluetooth, Near Field Communication (NFC), infrared, or other similar capabilities. Communications between the electronic device 10 and other devices (not shown) may occur via NFC, RFID, Bluetooth or the like only so a network connection from the electronic device 10 is unnecessary.

The communications interface 34 may include various network cards, and circuitry implemented in software and/or hardware to enable wired and/or wireless communications with other devices (not shown). Communications include, for example, conducting cellular telephone calls and accessing the Internet over a network. By way of example, the communications interface 34 may be a digital subscriber line (DSL) card or modem, an integrated services digital network (ISDN) card, a cable modem, or a telephone modem to provide a data communication connection to a corresponding type of telephone line. As another example, the communications interface 34 may be a local area network (LAN) card (e.g., for Ethernet™ or an Asynchronous Transfer Model (ATM) network) to provide a data communication connection to a compatible LAN. As yet another example, the communications interface 34 may be a wire or a cable connecting the electronic device 10 with a LAN, or with accessories such as, but not limited to, other electronic devices. Further, the communications interface 34 may include peripheral interface devices, such as a Universal Serial Bus (USB) interface, a PCMCIA (Personal Computer Memory Card International Association) interface, and the like.

The communications interface 34 also allows the exchange of information across the network 14 between the electronic device 10 and any other device (not shown) in the system 100. The exchange of information may involve the transmission of radio frequency (RF) signals through an antenna (not shown). Moreover, the exchange of information may be between the electronic device 10, the server 12, other electronic devices (not shown), and other computer systems (not shown) capable of communicating over the network 14.

Examples of other computer systems (not shown) include computer systems of service providers such as, but not limited to, financial institutions, medical facilities, national security agencies, merchants, telecommunications, automotive computer systems, and authenticators. The electronic devices (not shown) may be associated with any user or with any type of entity including, but not limited to, commercial and non-commercial entities.

The server 12 includes most of the same components as described herein for the electronic device 10. However, because the server 12 is primarily stationary, not primarily mobile, the server 12 may not include the gyroscope 20 and/or the accelerometer 22.

Pitch is the quality of speech that makes it possible to judge sounds as higher and lower. Human voices can vary pitch smoothly and across a wide range within a single utterance. Pitch varied over the duration of an utterance can be referred to as a pitch pattern. Such variations in pitch may indicate different emotions. For example, speech generated while a person is excited may have higher pitch and greater variation, while speech generated when a person is sad may have a lower, monotonous pitch. Such pitch patterns may be associated with corresponding emotional states.

The range of pitch refers to the typical extent of pitch variation an untrained human voice can produce during normal speech or emotional expression. The range of pitch for genuine speech is typically greater than the range for synthetic speech. Genuine speech typically includes a broad range of pitches while synthetic speech typically includes a narrower range of pitches.

Natural genuine human voice has a range of pitch that can span approximately 1.5 to 2 octaves on average in casual speech but can extend further in trained individuals such as singers. For example, a typical male voice might range from about 85 Hz to 155 Hz, considered to be low and high pitches, respectively, in normal speech. However, the higher pitches of male voices may be greater than 155 Hz, for example, 180 Hz and higher. A typical female voice might range from about 165 Hz to 255 Hz in normal speech. However, the higher pitches of an alto or a soprano may be greater than 255 Hz, for example, 200 Hz to 350 Hz depending on the speaker's vocal characteristics and context of the speech, particularly in animated or emphatic speech.

Synthetic speech typically includes a range of pitches narrower than genuine speech. This difference in pitch ranges or a lack of expected pitch variation may be considered an anomaly that may be used to facilitate distinguishing between genuine and synthetic speech. More specifically, the range of pitch in voice biometric data generated during a certain emotional situation may be compared against the expected range of pitch for the certain situation. For example, the speech of a football fan after his or her team wins the Super Bowl is expected to include a broad range of pitches. Speech for such a situation that has a narrow pitch range does not correlate with the expectation. This noncorrelation may be an anomaly that may be used to indicate the speech is synthetic.

Certain vocal exercises such as expressive recitation or singing may be used to exploit the natural range and pitch diversity inherent in human speech, thereby facilitating the detection of synthetic speech. Vocal exercises might include having a subject perform a scale, recite a poem with varying emotional emphasis, or sing a song. These exercises exhibit the pitch modulation capabilities inherent to human speech, with specific notes or phrases highlighted at different pitches. An analysis of speech generated as a result of these exercises might detail how an authentic voice modulates pitch when expressing questions versus statements or how excitement is portrayed through higher pitches and broader pitch excursions. Expressing a question may be evidenced by a rising intonation in speech while a falling or steady intonation may be evidence of expressing a statement.

Intensity or loudness fluctuations in speech may be analyzed by measuring the loudness variation and detecting abnormal fluctuations in the amplitude of the voice biometric data. Intensity or loudness fluctuations in speech may express emphasis, urgency or some type of emotion. For example, a sudden increase in volume might indicate anger or excitement, whereas a softer tone may imply sadness or secrecy. The identification of nuanced emotional expressions including, but not limited to, soft speech, crying, and exclamations of joy, can be used to distinguish genuine from synthetic speech. The intensity of speech can be analyzed to determine whether the speech is modulated in a manner consistent with an expressed or expected emotion. Speech that exhibits variations in loudness that do not correspond to an expressed or expected emotion natural speech dynamic or emotional expressiveness may be synthetic or otherwise fraudulent. Such non-corresponding loudness variations may be considered an anomaly that can be used to distinguish between authentic and synthetic speech.

The timbre or quality of speech is marked by a complex blend of vibrations and overtones. Speech may be characterized as breathy, harsh, or nasal depending on the emotional state of the speaker. Different timbres and corresponding emotional states can be defined and used to facilitate detecting synthetic speech. The timbral characteristics of captured voice biometric data can be analyzed to detect emotional nuances. If the detected emotional nuances correspond to the expected emotional nuances the captured voice biometric data may be authentic. If the detected emotional nuances do not correspond to the expected emotional nuances, the non-correspondence may be evidence that the speech is synthetic. As a result, non-correspondence of detected emotional nuances may be considered an anomaly that can be used to distinguish between authentic and synthetic speech.

The authenticity of voice biometric data may be determined using indicators based on timbre including, but not limited to, consistency with human timbral characteristics, comparison against thresholds, anomaly detection, and formant analysis.

Consistency with human timbral characteristics involves determining whether voice biometric data includes a rich, dynamic spectrum of harmonics and smooth formant transitions typical of human voices. A score may be calculated for each timbral characteristic that represents the characteristic in voice biometric data. The score may be compared against a threshold value. Satisfying the threshold value typically indicates that there is a match or close correlation between the voice biometric data and what is expected in authentic speech. Failing to satisfy the threshold score may be evidence that the voice biometric data includes anomalies, which may facilitate determining the voice biometric data is synthetic. Anomalies can be abnormal timbral features included in speech, for example, a lack of expected complexity, unusual harmonic structures, or erratic formant movements. Formants are resonant frequencies of the vocal tract that shape the voice's timbre. Formant patterns can be analyzed by noting the variability and transitions that occur naturally in human speech as opposed to the more static or inconsistent formant patterns in synthetic speech.

Concluding that voice biometric data includes typically human timbral characteristics is evidence that facilitates supporting a decision that the voice biometric data is authentic. Otherwise, the voice biometric data may be synthetic.

Each person has a unique voice which can be defined by a combination of timbral characteristics distinct to each person. Each person's voice is shaped by the unique anatomical structures of his or her vocal apparatus, which produces uniquely identifiable timbral qualities. The timbral changes that accompany different emotional states, for example, happiness, sadness and anger, can be part of a person's voice, as these modulations are influenced by individual expressiveness and physiological responses. The way a person articulates speech sounds, for example, crispness, clarity, and rate of speech also contributes to his or her unique voice. For example, a person might consistently produce brighter vowels or darker consonants.

Timbre analysis employs advanced acoustic metrics to capture the nuanced and dynamic nature of human vocal timbre. More specifically, timbre may be analyzed using techniques such as spectral analysis and harmonic-to-noise ratio (HNR). Spectral analysis involves breaking down a voice signal into its constituent frequencies using techniques such as, but not limited to, Fast Fourier Transform (FFT). The spectral content reveals the rich harmonics and overtones characteristic of human voices, which are typically simplified or absent in synthetic speech.

Harmonic-to-Noise Ratio (HNR) is a metric that facilitates evaluating the amount of harmonic sound relative to noise in voice biometric data. Harmonic sound is typically periodic whereas noise is typically aperiodic. Human voices have a complex blend of periodic and aperiodic components that change dynamically with expression and emotion, unlike synthetic voices that may have more static or less nuanced HNR profiles.

Voice resonators are anatomical amplifiers unique to each person that impacts speech modulation and richness. Example voice resonators include, but are not limited to, the throat, nasal passages, chest cavity, and oral cavities. The throat can amplify mid-range frequencies which enhances the resonance of speech to create a more intense and focused sound that may convey a sense of urgency or excitement.

The nasal passages of each individual add a distinct coloration to the speech of the individual, especially noticeable in sounds like 'm,'"n,' and 'ng.' A natural voice may show subtle nasal resonance in normal speech. However, synthetic speech typically includes an exaggerated nasal resonance or no nasal resonance.

The chest cavity enhances lower speech frequencies, giving depth and warmth to speech. Authentic speech might include a resonant, full-bodied quality when speaking from the chest, indicative of genuine emotional expression or particular speech styles.

Oral cavities include the mouth of each individual. The mouth facilitates shaping and filtering sound, thus impacting the articulation and clarity of speech. Speech variations created by the mouth facilitate creating vowel sounds and speech intelligibility. Differences in oral resonance reflect individual articulatory habits or emotional states.

The interplay and mutual influence among various resonators may be analyzed using acoustic analysis, spectrographic analysis, and formant tracking. Acoustic analysis involves recording and analyzing voice biometric data to identify characteristic resonance patterns. The resonance patterns can be compared against expected record resonance pattern data.

Spectrograms can show the distribution of energy across different frequencies over time. Spectrographic analysis involves analyzing a spectrogram to reveal how different resonators contribute to the overall timbre of speech. Human speech displays dynamic and complex spectrographic patterns that are challenging to replicate accurately in synthetic speech.

Prominent resonant frequencies in voice biometric data are known as formants. Formant tracking involves tracking the formants in voice biometric data, which provides insights into how airflow and tissue vibration interact within the vocal tract. Discrepancies in expected formant patterns can indicate anomalies related to synthetic speech.

Techniques for identifying how airflow is directed to resonate within various bodily cavities include, but are not limited to, flow phonation analysis, harmonic analysis, and resonance tuning. Flow phonation analysis examines how smoothly air flows through the vocal tract and is modulated by various resonators. In authentic speech, the flow phonation is dynamic and responsive to expressive intent, while synthetic speech may exhibit less variability and responsiveness.

Harmonic analysis assesses the harmonic structure produced by voice biometric data. Resonators affect the harmonic content and authentic speech to exhibit a rich harmonic structure that changes fluidly with speech dynamics.

Resonance tuning refers to the adjustment of resonator shape and size, as observed in real-time speech production. Techniques such as magnetic resonance imaging (MRI) or real-time spectrographic feedback during phonation can provide information about resonance tuning. Experienced speakers or singers have been known to skillfully tune his or her resonators to enhance expressivity or to project their voice.

The interplay and mutual influence among various resonators may be analyzed to discern the unique voice coloring of a person, an aspect seldom accurately replicated in synthetic speech. Typical resonator usage patterns may be recognized and inked to specific voice qualities such as depth or nasality, to further authenticate speech.

Voice Color includes, for example, depth and warmth, nasality, brightness and clarity. A person who uses chest resonation effectively can speak with depth and warmth, which is often associated with sincerity or calmness. For example, a parent reading to a child may read or speak with warmth and depth.

Speech that predominantly uses nasal passages can have a noticeable nasal quality. For example, when a person is excited or speaks rapidly the nasal tone might become more pronounced. The more pronounced nasal tone may add a distinct color to the person's speech that can be indicative of his or her emotional state or identity.

The use of oral resonators can lend a voice brightness and clarity, characteristics often perceived in enthusiastic or articulate speech. An actor projecting joy or surprise might exhibit increased brightness in his or her speech tone.

Analyzing voice coloring involves scrutinizing how sound is produced and modulated by different resonators. Such analyses may be conducted, for example, using resonator balancing and voice print analysis. Resonator balancing involves analyzing the balance between using different resonators like the chest, mouth, and head. This balance can be analyzed by assessing the amplitude and frequency distribution in speech, and identifying which resonators are predominantly used in various speaking contexts.

Techniques that can be used to analyze and understand voice coloring include, but are not limited to, spectral decomposition, formant mapping, and timbre analysis. Spectral decomposition involves breaking down speech into its constituent frequencies to analyze the specific contributions of different resonators. Peaks in the spectrum can indicate dominant resonator usage, helping to identify unique voice coloring attributes.

Formant frequencies are resonant frequencies of the vocal tract. Formant mapping involves mapping the formant frequencies which enables deducing which resonators are predominant in speech. Variations in formant patterns can reveal how voice coloring changes with emotion or intent.

It should be understood that timbre analysis involves evaluating the quality and color of voice biometric data and focusing on harmonic structures and overtones that may differ in synthetic voices.

Timbre analysis involves assessing the blend of harmonics in speech and identifying characteristics in the speech that contribute to the unique color of the speech.

Genuine human speech exhibits variable pacing. For example, a speaker may speak faster when excited or speak slower to emphasize a point. Moreover, human speech dynamics change with emotional context. For example, a person might speak rapidly and with less clarity when anxious, or their voice might quiver when sad. Excitement might be conveyed with increased pitch and volume, whereas disappointment might lead to a decrease in both. Thus, rapid speech might denote excitement or anxiety, while a slower rate might be used to convey solemnity or sadness.

Authentic conversations include natural pauses, for example, taking a breath or thinking about what to say during the conversation which contrasts with the mechanical delivery found in synthetic speech. Natural pauses may result from a person's unique speech habits or quirks such as a person's characteristic way of laughing, hesitating with "um" or "ah," or altering tone mid-conversation. Another example might be code-switching, where a bilingual speaker subconsciously flips between languages or dialects based on the context.

The pacing and rhythm of speech may be analyzed to identify authentic human speech patterns characterized by variability in speed, pauses, and fluency. How emotional context influences speech dynamics, including reaction to stimuli and the presence of natural speech idiosyncrasies may be considered to effectively distinguish between human and synthetic speech.

A detailed temporal analysis of speech may be conducted that records variations in speed, pauses, and rhythm to establish a record of natural speech dynamics for comparison against speech captured during, for example, an authentication transaction to facilitate detecting synthetic speech.

The emotional context of voice biometric data captured during, for example, an authentication transaction can be analyzed for patterns typically associated with specific emotions. Patterns can include changes in pitch, volume, and speed, which are then correlated with the linguistic and situational context to assess authenticity of the captured speech.

Temporal characteristics of captured voice biometric data may be analyzed to identify patterns of pacing and pausing that align with natural speech norms. Voice biometric data that includes unnatural timing patterns such as a consistent speech rate or abnormal pauses may indicate that speech is synthetic. Thus, unnatural timing patterns such as a consistent speech rate or abnormal pauses may be considered anomalies that can be used to distinguish between authentic and synthetic speech. Moreover, spectral analysis may be used to analyze the frequency components of captured speech to observe how the frequency components change with different emotional states or with speech dynamics to identify authentic human expressiveness.

Natural Language Processing (NLP) techniques can be employed to facilitate understanding the situational context of speech to facilitate interpreting the emotional significance of specific speech dynamics and idiosyncrasies.

Analyzing the pacing of speech as described herein, facilitates distinguishing the nuanced and variable nature of human speech from the more static or predictable speech generated by synthetic speech generators.

Emotional states can affect articulation clarity and pronunciation. Stress, for example, might lead to more clipped or less articulate speech. Articulation patterns in speech may be analyzed to detect inconsistencies of overly uniform pronunciation, which may indicate synthetic speech. Moreover, mismatches between expected emotional tone based on context and the actual emotional tone conveyed by the speech may indicate that the speech is synthetic. Inconsistencies of overly uniform pronunciation and mismatches between expected emotional tone based on context and the actual emotional tone conveyed by the speech may be anomalies that can be used to distinguish between authentic and synthetic speech.

Prosody refers to the rhythm, stress, and intonation of speech, which are integral to conveying emotion. For example, interrogative intonation rises at the end of a sentence. Prosodic aspects of speech may be analyzed to determine whether the emotional expression of speech is coherent and consistent. More specifically, inconsistencies in stress patterns or intonation curves unusual for the context or language norm may indicate that the speech is synthetic or otherwise fraudulent. Thus, inconsistencies in stress patterns or intonation curves unusual for the context or language norm may be anomalies that can be used to distinguish between authentic and synthetic speech.

Rhythm as described herein is the flow and pace of speech. The natural flow and pace of a user's speech can be analyzed to find patterns or irregularities in the speed of speech, which can sometimes indicate stress, uncertainty, or scripting, which are common in spoofing attacks. Unusual pauses or changes in the rhythm of speech, such as hesitations or rushed sequences, might suggest that the speaker is not genuine or is following a premeditated script.

Natural speech involves variations in pitch. The variations in pitch are assessed to determine if they fit the normal speech patterns of the user or if they seem unnatural or monotone, as might be the case with synthetic voices. Intonation is closely tied to emotional expression. Changes in intonation based on the conversational context facilitates identifying if the voice lacks the emotional depth or variability expected in genuine human speech. A lack of natural pitch variation across sentences or an unexpected pitch contour within a phrase may indicate that speech is synthetic. Thus, a lack of natural pitch variation across sentences or an unexpected pitch contour within a phrase may be anomalies that can be used to distinguish between authentic and synthetic speech.

The time taken by a user to respond to prompts or questions during, for example, an authentication transaction can also be evaluated. An unusually fast response or a consistent delay might indicate a synthetic interaction or a person following a script. Analyzing the duration of spoken phrases can reveal information that may facilitate determining whether data is fraudulent. For example, unusually short or long durations, or a lack of variability in durations, might be characteristic of synthetic speech and thus can constitute anomalies that can be used to distinguish between authentic and synthetic speech.

Figure 3:
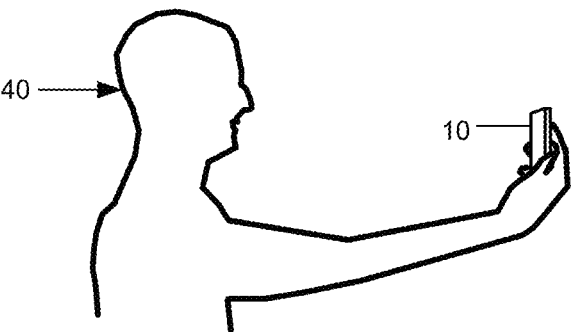
FIG. 3 is a side view of a person operating the electronic device.

FIG. 3 is a side view of a person 40 operating the electronic device 10 to capture data of a biometric modality from his or herself. As described herein, the biometric modality is voice. However, the biometric modality may additionally, or alternatively, be any biometric modality, for example, face, fingerprint, iris or any combination of thereof. The person from whom such data is caught is referred to herein as a user 40. The user 40 typically operates the electronic device 10 during capture. However, a different person may operate the electronic device 10 while the electronic device 10 captures data of a biometric modality of the user 40.

Figure 4:
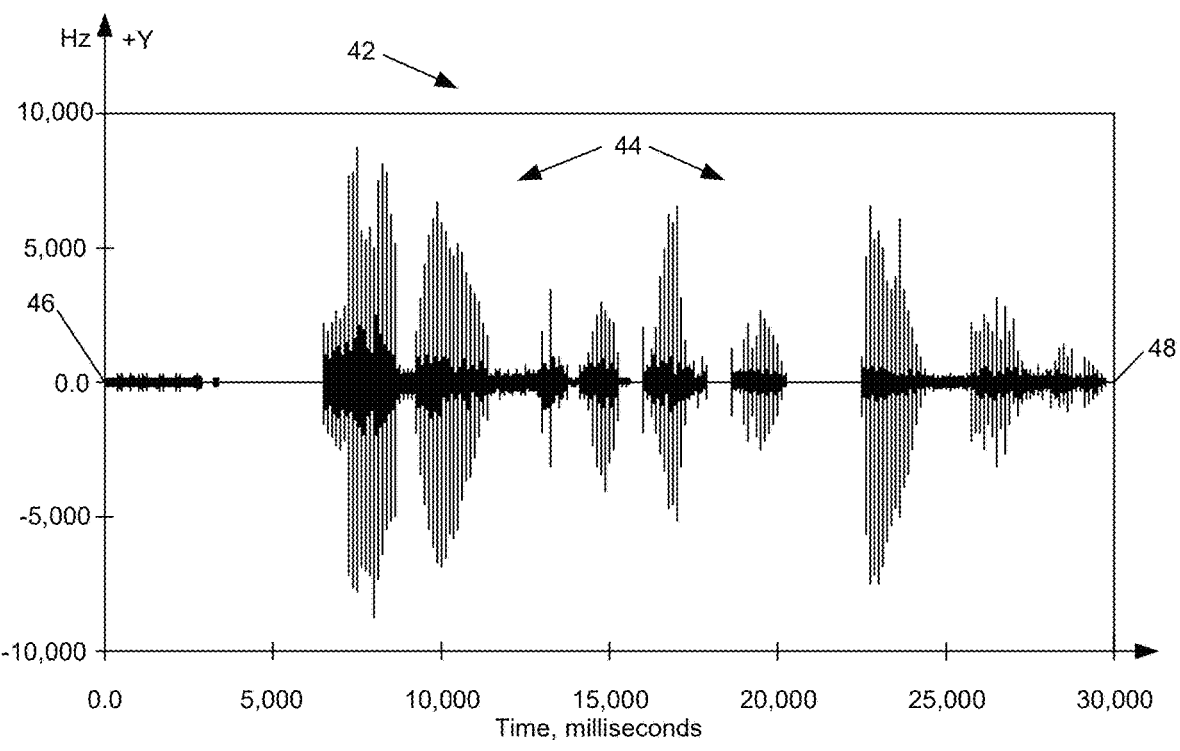
FIG. 4 is a diagram illustrating an example audio signal captured by the electronic device while the person spoke a phrase.

FIG. 4 is a diagram 42 illustrating an example audio signal 44 captured by the electronic device 10 while a user spoke a phrase. The audio signal 44 may be captured by the electronic device 10 while it is operated by the user or another person. The audio signal 44 is audio data that represents captured voice biometric data of the user. The audio signal 44 may be stored in the data record of the user associated with the electronic device 10. The audio signal 44 and a template generated therefrom may be referred to as record audio data or record voice biometric data.

The audio signal 44 is plotted on a Cartesian coordinate system having X and Y-axes. The audio signal 44 extends from the origin 44 to a terminus 48 and has a duration of about three (3) seconds. The duration of the audio signal 44 depends on the length of the spoken phrase which may also vary. Frequency is measured along the Y-axis in Hertz.

The audio signal 44 illustrates the frequency spectrum of the user's speech. The frequency spectrum includes frequencies that vary, for example, between about 9,000 Hz to about negative 9,000 Hz over the duration of the audio signal 44. Moreover, the audio signal illustrates other characteristics of speech. For example, the audio signal 44 includes pauses from about 4,000 milliseconds (ms) to about 6,000 ms and from about 20,000 ms to about 22,500 ms.

Random, non-intrusive distortions or "salts" may be incorporated into audio signals. "Salts" are designed to be imperceptible to users while enhancing the difficulty of synthetically modeling voice biometric data. "Salts" are dynamic and user-specific, changing with each interaction to prevent effective modeling by attackers. "Salts" effectively modify the audio signal 44. It is contemplated by the present disclosure that an audio signal may be updated then modified before being stored in the memory 18.

The salts may be incorporated into the signal 44, for example, by altering the frequency modulation of the audio signal 40, randomly altering inflection points and words, and intermittently introducing background noise. Altering the frequency modulation of audio signals can be done, for example, by adjusting certain frequency bands randomly within a predefined range to create a unique modulation pattern for each interaction. Randomly altering inflection points and words in audio signals can be done, for example, by introducing slight variations in pitch, duration, and emphasis to create a dynamic and unpredictable voice pattern. Background noise may be intermittently introduced into audio signals to obscure the audio signal and complicate synthetic replication attempts. The background noise may vary in type and intensity. Examples of background noise include, but are not limited to, white noise, ambient sounds, rustling leaves, distant chatter, and low-level speech noise. Background noise should be subtle enough not to interfere with the ability of a person to communicate but sufficient to complicate synthetic replication.

Figure 5:
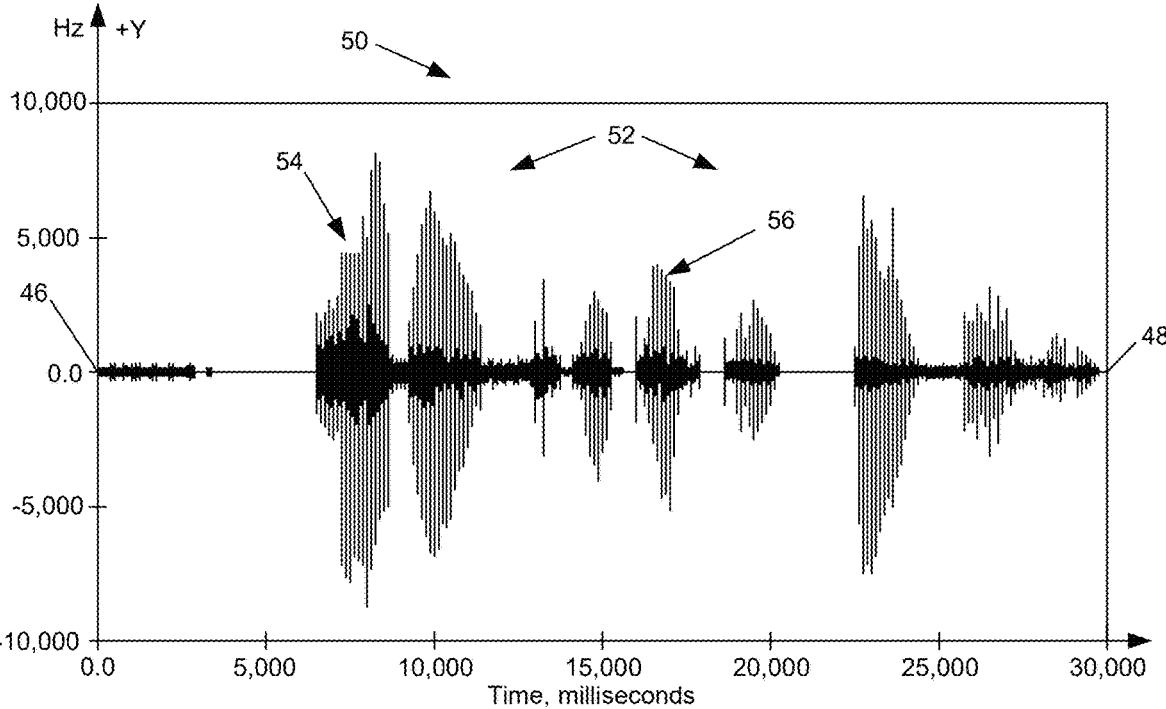
FIG. 5 is a diagram illustrating an example modified audio signal.

FIG. 5 is a diagram 50 illustrating an example modified audio signal 52. The modified signal 52 is substantially the same as the signal 44. However, the modified signal 52 represents a modification of the signal 44 because the signal 52 includes two regions 54 and 56 that are different than the signal 44. The differences exhibited in the regions 54 and 56 can be caused by incorporating random, non-intrusive distortions into the signal 44.

Factors such as aging, illness, emotional state, and environmental conditions can affect a person's voice, potentially leading to increased false rejection rates and decreased satisfaction, which may lead to a lower Net Promoter Score (NPS) for large enterprises servicing global consumers. A lower NPS may negatively impact the brand of such an enterprise. Known voice biometric systems typically do not adapt to changes in a person's voice over time. The data records are thus typically static. The inability of these systems to change makes them increasingly susceptible to synthetic voice and deep fake attacks, which can exploit the static nature of record voice data to conduct fraudulent authentication transactions.

Imposters have been known to use synthetic voice technologies to generate synthetic voice data that mimics a person's record voice biometric data for use in gaining unauthorized access to the person's information. Known detection algorithm and security protocol development has not been able to keep up with the evolution of such synthetic voice technologies. Security measures like those implemented by known voice authentication systems may not adequately protect record voice biometric data against unauthorized access and tampering. As a result, voice biometric data may be stolen or manipulated which would compromise the integrity of the biometric system and expose users to potential fraud. Consequently, there is a need for more advanced security mechanisms that can detect synthetic voice data and adapt to the evolving sophistication of synthetic speech technologies.

To address these problems the electronic device 10 may receive voice biometric data of a user captured while the user was speaking and analyze the context in which the received voice biometric data was captured. The context can include environmental and situational factors. Moreover, the electronic device 10 can analyze characteristics of the received voice biometric data to detect anomalies associated with synthetic speech, and in response to determining the received voice biometric data is free of anomalies conduct a biometric authentication transaction based on the received voice biometric data. In response to successfully authenticating the user, the electronic device 10 can update record voice biometric data of the user with the received voice biometric data, modify the updated record voice biometric data, and securely store the updated record voice biometric data.

Figure 6:
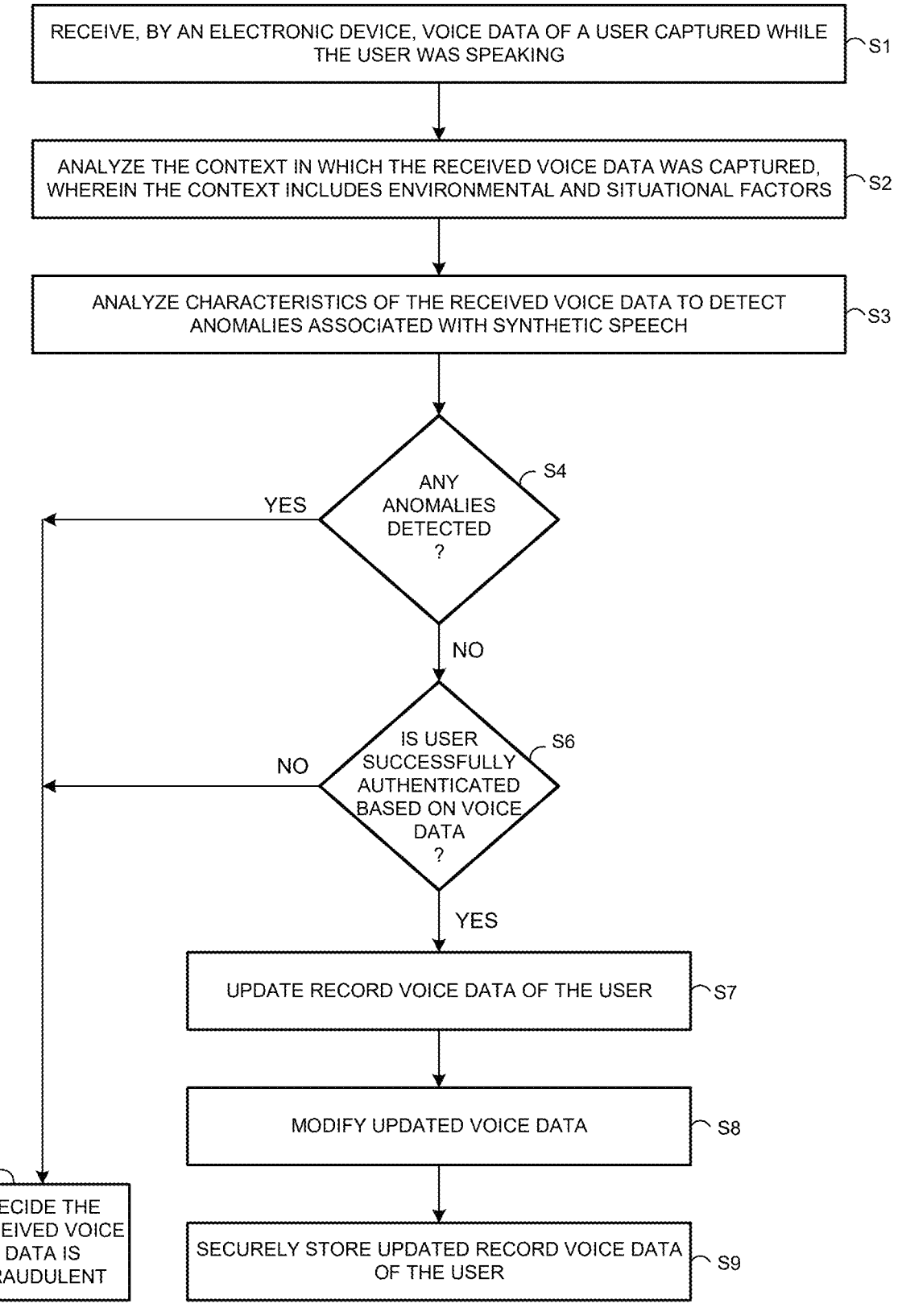
FIG. 6 is a diagram illustrating an example method and algorithm for enhancing the security of voice biometric data according to an embodiment of the present disclosure.

FIG. 6 is a diagram illustrating an example method and algorithm for enhancing the security of voice biometric data according to an embodiment of the present disclosure. A user may be required to authenticate his or her identity before being permitted to conduct, using the electronic device 10, a desired network-based transaction. Such network-based transactions include, but are not limited to, buying merchandise from a merchant service provider website, accessing top secret information from a computer system, or opening an account at a financial institution. Detecting synthetic speech would facilitate reducing fraud and related inconvenience and costs. FIG. 6 illustrates example steps performed when the electronic device 10 runs software 38 stored in the memory 18 to enhance the security of voice biometric data.

In step S1, the software 38 executed by the processor 16 causes the electronic device 10 to receive voice biometric data of a user captured while the user was speaking. The voice biometric data may be captured during, for example, an authentication transaction. In step S2, the software 38 executed by the processor 16 causes the electronic device 10 to analyze the context in which the received voice biometric data was captured. The context can include environmental and situational factors. Examples of environmental factors include, but are not limited to, noise and recording device characteristics. Examples of situational factors include, but are not limited to, whether the user is under duress and whether the user is excited. Situational factors typically relate to user behavior.

Next, in step S3, the software 38 executed by the processor 16 causes the electronic device 10 to analyze characteristics of the received voice biometric data to detect anomalies associated with synthetic speech. Characteristics of the received voice biometric data include, but are not limited to, the range of pitch, timbre, intensity or loudness, voice resonators, pace, prosody, rhythm, nature of speech and frequency.

Anomalies may be present in each characteristic that may be associated with synthetic speech. For example, for the range of pitch an anomaly may be that the received voice biometric data has a narrower range of pitch than typically included in authentic speech. For timbre, anomalies can include, but are not limited to, a lack of expected complexity, unusual harmonic structures, and erratic formant movements. For intensity or loudness, an anomaly may be variations in volume that do not correspond with an expressed or expected emotion. For voice resonators, an anomaly may be less variability and responsiveness. For pace, an anomaly may be unnatural timing patterns like a consistent speech rate or abnormal pauses. For prosody, anomalies can include inconsistencies in stress patterns or intonation curves unusual for the context or language norm. For rhythm, anomalies can include unusual pauses or changes in the rhythm of speech such as hesitations or rushed sequences. For natural speech, anomalies can include, but are not limited to, a lack of natural pitch variation across sentences, an unexpected pitch contour within a phrase, unusually long or short durations, or a lack of variability in durations. For frequency, an anomaly can be that the frequency does not exceed a threshold established for synthetic speech, for example, up to 5,354 Hz.

In step S4, the software 38 executed by the processor 16 causes the electronic device 10 to determine whether any anomalies have been detected. If so, in step S5, the software 38 executed by the processor 16 causes the electronic device 10 to decide that the received voice biometric data is fraudulent. However, if the received voice biometric data is free of anomalies, in step S6, the software 38 executed by the processor 16 causes the electronic device 10 to conduct a biometric authentication transaction based on the received voice biometric data.

For example, the software 38 executed by the processor 16 may cause the electronic device 10 to create a biometric template from the received voice biometric data. The biometric template may be compared against a corresponding record biometric template of the user and a matching score can be calculated for the comparison. The matching score may be compared against a threshold value. When the matching score fails to satisfy the threshold value, the identity of the user is not successfully authenticated. Next, in step S5, the software 38 executed by the processor 16 causes the electronic device 10 to decide that the received voice biometric data is fraudulent.

However, when the matching score satisfies the threshold score the identity of the user is successfully authenticated as true. Next, in step S7, the software 38 executed by the processor 16 causes the electronic device 10 to update the record voice biometric data of the user. The record voice biometric data may be updated by combining it with the received voice biometric data. A biometric template may be created from the combined voice biometric data.

Next, in step S8, the software 38 executed by the processor 16 causes the electronic device 10 to use "salts" to modify the updated voice biometric data. The modifications may be, for example, random, non-intrusive distortions incorporated into the updated voice biometric data. The modifications are designed to be imperceptible to users while enhancing the difficulty of synthetically modeling voice biometric data. The modifications are dynamic and user-specific, changing with each authentication transaction to prevent effective modeling by attackers.

The modifications may be incorporated into the updated voice biometric data, for example, by altering the frequency modulation of the updated voice biometric data, randomly altering inflection points and words in the updated voice biometric data, and intermittently introducing background noise into the updated voice biometric data. Altering the frequency modulation of the updated voice biometric data can be done, for example, by adjusting certain frequency bands randomly within a predefined range to create a unique modulation pattern for each interaction. Randomly altering inflection points and words in the updated voice biometric data can be done, for example, by introducing slight variations in pitch, duration, and emphasis to create a dynamic and unpredictable voice pattern. Intermittently introducing background noise that varies in type and intensity, such as white noise, ambient sounds, or low-level speech noise, into the updated voice biometric data facilitates obscuring the voice biometric data and thus enhances the difficulty of synthetically modeling the voice biometric data.

Next, in step S9, the software 38 executed by the processor 16 causes the electronic device 10 to securely store the modified updated voice biometric data in the memory 18. For example, the modified updated voice biometric data may be locked using, for example, encryption, access control protocols, tamper-proof storage solutions or other security protocols that ensure the integrity and confidentiality of the modified updated voice biometric data. The modified updated voice biometric data may be encrypted using cryptographic algorithms. Access control protocols manage access to encrypted record voice biometric data.

Alternatively, or additionally, the modified updated voice biometric data may be recorded in a tamper-proof ledger using blockchain technology, which enhances the integrity of modified updated voice biometric data by creating a decentralized and immutable record of each voice biometric data entry. Prior to recording voice biometric data, a cryptographic hash can be calculated for the voice biometric data which uniquely identifies the voice biometric data and facilitates preventing unauthorized alterations. Moreover, each voice biometric data entry may be validated against previous voice biometric data entries to ensure received voice biometric data is authentic. Using blockchain technology provides an auditable trail of all voice biometric data entries to enhance transparency and security.

It is contemplated by the present disclosure that as a result of repeatedly updating, modifying and storing voice biometric data in accordance with the example methods and algorithms described herein, the record voice biometric data for each user becomes more detailed and complex which enhances the difficulty of creating fraudulent copies of record voice biometric data using Artificial Intelligence (AI) techniques. As a result, the security of record voice biometric data is facilitated to be enhanced and the trustworthiness of authentication transaction results based on such voice biometric data is facilitated to be enhanced. Moreover, by repeatedly updating, modifying and storing voice biometric data in accordance with the example methods and algorithms described herein the record voice biometric data more accurately reflects the voices of users, which facilitates reducing false rejections, increasing the ease of use, and enhancing improved customer experiences.

The information shown in FIG. 7 includes some of the same information shown in FIG. 6 as described in more detail below. As such, features illustrated in FIG. 7 that are identical to features illustrated in FIG. 6 are identified using the same reference numerals used in FIG. 6.

Figure 7:
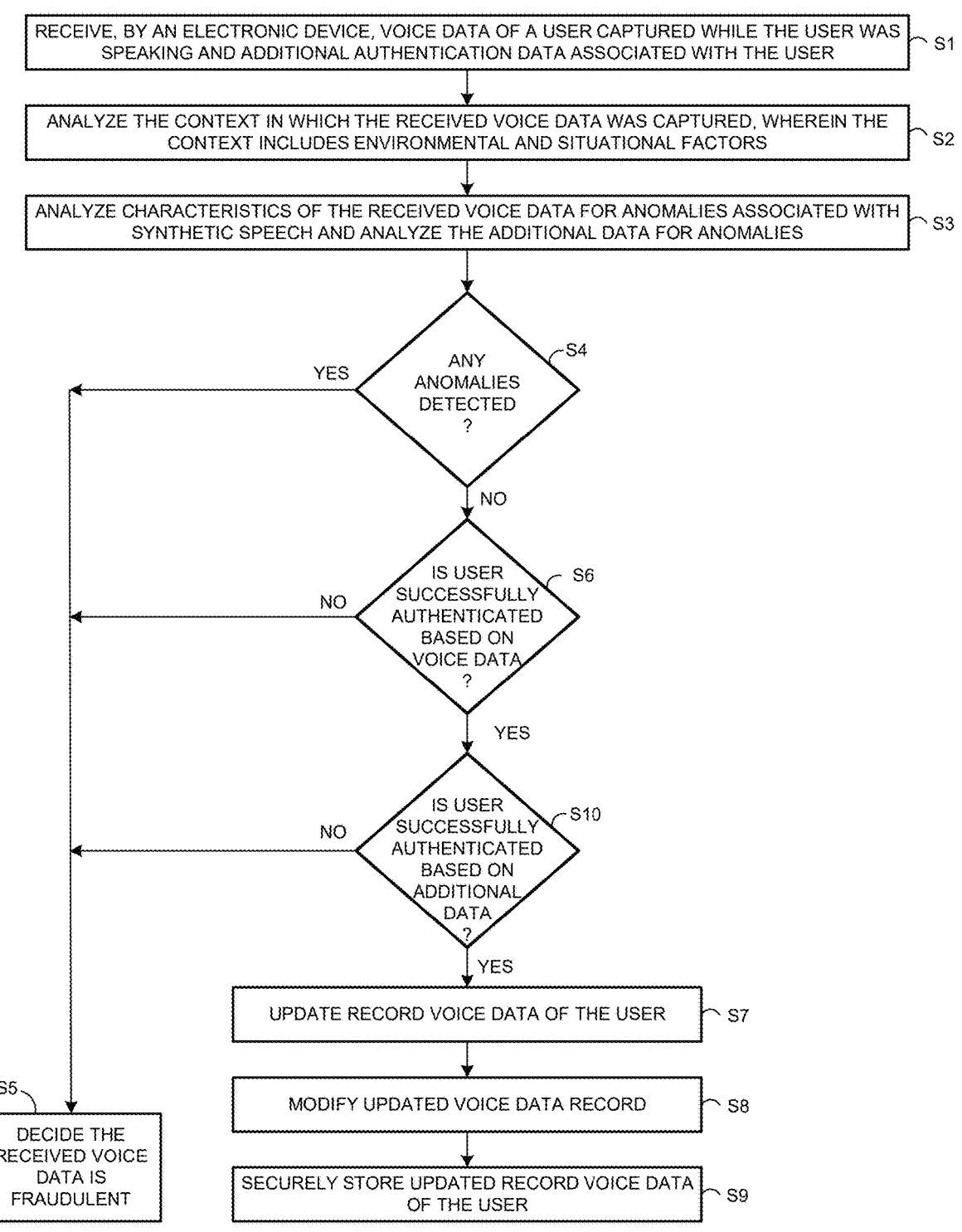
FIG. 7 is a diagram illustrating another example method and algorithm for enhancing the security of voice biometric data according to another embodiment of the present disclosure.

FIG. 7 is a diagram illustrating another example method and algorithm for enhancing the security of voice biometric data according to another embodiment of the present disclosure. This method is similar to that shown in FIG. 6. However, in step S1, the software 38 executed by the processor 16 causes the electronic device 10 to receive voice biometric data of a user while the user was speaking as well as additional authentication data associated with the user. In step S3, the additional authentication data is analyzed for anomalies, and in new step S10, an authentication transaction is conducted based on the additional authentication data. The voice biometric data and additional data received in step S1 may be captured during, for example, an authentication transaction.

The additional authentication data may be any type of data that may be used to authenticate the identity of users. For example, the additional authentication data may include data of a biometric modality of the user or data regarding knowledge-based factors. Example biometric modalities include, but are not limited to, voice, face, and fingerprint. Biometric modality data may also include data regarding the behavior of the user, for example, typing on a keyboard or maneuvering a mouse. Example knowledge-based factors include, but are not limited to, passwords and answers to security questions.

In step S2, the software 38 executed by the processor 16 causes the electronic device 10 to analyze the context in which the voice biometric data was captured. The context can include environmental and situational factors. Examples of environmental factors include, but are not limited to, noise and recording device characteristics. Examples of situational factors include, but are not limited to, whether the user is under duress and whether the user is excited while at the Super Bowl. Situational factors typically relate to user behavior.

Next, in step S3, the software 38 executed by the processor 16 causes the electronic device 10 to analyze characteristics of the received voice biometric data to detect anomalies associated with synthetic speech, and to analyze the additional data for anomalies. Characteristics of the captured voice biometric data include, but are not limited to, the range of pitch, timbre, intensity or loudness, voice resonators, pace, prosody, rhythm, nature of speech and frequency. Analyzing the additional authentication data for anomalies may include, for example, comparing the additional authentication data against corresponding record user data to detect discrepancies between them. Any discrepancy may be considered an anomaly.

In step S4, the software 38 executed by the processor 16 causes the electronic device 10 to determine whether any anomalies have been detected in either the voice biometric data or the additional authentication data. If an anomaly is detected in the received voice biometric data or in the additional authentication data, in step S5, the software 38 executed by the processor 16 causes the electronic device 10 to decide that the received voice biometric data is fraudulent.

However, if the voice biometric data and the additional authentication data are both free of anomalies, in step S6, the software 38 executed by the processor 16 causes the electronic device 10 to conduct a biometric authentication transaction based on the received voice biometric data.

For example, the software 38 executed by the processor 16 may cause the electronic device 10 to create a biometric template from the received voice biometric data. The biometric template may be compared against a corresponding record biometric template of the user and a matching score can be calculated for the comparison. The matching score may be compared against a threshold value. When the matching score fails to satisfy the threshold value, the identity of the user is not successfully authenticated. Next, in step S5, the software 38 executed by the processor 16 causes the electronic device 10 to decide that the received voice biometric data is fraudulent.

However, when the matching score satisfies the threshold score the identity of the user is successfully authenticated as true. Next, in step S10, the software 38 executed by the processor 16 causes the electronic device 10 to conduct an authentication transaction based on the additional authentication data. For example, the software 38 executed by the processor 16 may cause the electronic device 10 to compare the additional authentication data against corresponding record authentication data of the user and generate a matching score for the comparison. The matching score may be compared against a different threshold value.

When the matching score fails to satisfy the different threshold value, the identity of the user is not successfully authenticated. Next, in step S5, the software 38 executed by the processor 16 causes the electronic device 10 to decide that the received voice biometric data is fraudulent.

However, when the matching score satisfies the different threshold score the identity of the user is successfully authenticated as true. Next, in step S7, the software 38 executed by the processor 16 causes the electronic device 10 to update the record voice biometric data of the user. The record voice biometric data may be updated by combining it with the received voice biometric data. A biometric template may be created from the combined voice biometric data.

Next, in step S8, the software 38 executed by the processor 16 causes the electronic device 10 to modify the updated voice biometric data. The modifications may be, for example, random, non-intrusive distortions incorporated into the updated voice biometric data. The modifications are designed to be imperceptible to users while enhancing the difficulty of synthetically modeling the updated voice biometric data. The modifications are dynamic and user-specific, changing with each authentication transaction to prevent effective modeling by attackers.

The modifications may be incorporated into the updated voice biometric data, for example, by altering the frequency modulation of the updated voice biometric data, randomly altering inflection points and words into the updated voice biometric data, and intermittently introducing background noise into the updated voice biometric data.

Next, in step S9, the software 38 executed by the processor 16 causes the electronic device 10 to securely store the modified updated voice biometric data in the memory 18. For example, the modified updated voice biometric data may be locked using, for example, encryption, access control protocols, tamper-proof storage solutions or other security protocols that ensure the integrity and confidentiality of the modified updated voice biometric data. The modified updated voice biometric data may be encrypted using cryptographic algorithms. Access control protocols manage access to encrypted record voice biometric data.

The threshold values described herein may be satisfied when a matching score is less than or equal to the threshold value. Other threshold values may be satisfied when the matching score is equal to or greater than the threshold value. Alternatively, the threshold value may include multiple threshold values, each of which is required to be satisfied to satisfy the threshold value.

It is contemplated by the present disclosure that the threshold values described herein may be adaptive threshold values. Moreover, a different adaptive threshold value may be calculated for each different person. The adaptive threshold values may be developed by analyzing the context in which received voice biometric data was captured, including environmental and situational factors such as, but not limited to, background noise, recording device characteristics, and user behavior. Initial threshold values may be calculated for each user based on historical voice biometric data of the user, considering variations in the user's voice over time. Specific security requirements may also be considered when generating the adaptive threshold. For example, the access level of a transaction desired to be conducted by a user may be considered when generating the adaptive threshold.

Machine learning algorithms may be used to dynamically adjust the threshold values in real-time based on continuous monitoring and analysis of received voice biometric data and contextual information. The initial threshold values may be updated by incorporating feedback from successful and failed authentication transactions to improve accuracy and reliability. The adaptive thresholds may be applied during each authentication transaction to facilitate distinguishing between genuine and synthetic voice data as well as between genuine and fraudulent additional authentication data. The adaptive thresholds and data used to generate the thresholds may be stored, for example, in the memory 18 to protect the adaptive thresholds against tampering.

Using the methods and algorithms for enhancing the security of voice biometric data as described herein enables enhancing the difficulty of creating fraudulent copies of record voice biometric data using Artificial Intelligence (AI) techniques which in turn facilitates enhancing the trustworthiness of authentication transaction results. Moreover, using the methods and algorithms for enhancing the security of voice biometric data as described herein enables record voice biometric data to more accurately reflect the voices of users which facilitates reducing false rejections, facilitates increasing the case of use, and facilitates enhancing improved customer experiences.

It is contemplated by the present disclosure that the example methods and algorithms described herein may be implemented as one or more machine learning models that may be periodically retrained with data captured during, for example, authentication transactions of the same or different users. Doing so facilitates adapting the example methods and algorithms described herein to evolving synthetic speech generation techniques which further facilitates the reduction of risks associated with conducting network-based transactions. The machine learning models may be retrained after any period of time, for example, every three to six months.

It is contemplated by the present disclosure that the example methods and algorithms described herein may be conducted entirely by the electronic device 10; partly by the electronic device 10 and partly by the server 12; entirely by the server 12, or by any other combination of other servers (not shown), electronic devices (not shown), or computers (not shown) operable to communicate with the electronic device 10 and the server 12 via the network 14. Furthermore, data described herein as being stored in the electronic device 10 may alternatively, or additionally, be stored in the server 12 or any other server (not shown), electronic device (not shown), or computer (not shown) operable to communicate with the electronic device 10 via the network 14.

Additionally, the example methods and algorithms described herein may be implemented with any number and organization of computer program components. Thus, the methods and algorithms described herein are not limited to specific computer-executable instructions. Alternative example methods and algorithms may include different computer-executable instructions or components having more or less functionality than described herein.

The example methods and/or algorithms described above should not be considered to imply a fixed order for performing the method and/or algorithm steps. Rather, the method and/or algorithm steps may be performed in any order that is practicable, including simultaneous performance of at least some steps. Moreover, the method and/or algorithm steps may be performed in real time or in near real time. For any method and/or algorithm described herein, there can be additional, fewer, or alternative steps performed in similar or alternative orders, or in parallel, within the scope of the various embodiments, unless otherwise stated. Furthermore, the invention is not limited to the embodiments of the methods and/or algorithms described above in detail.

What is claimed:

1. A method for enhancing the security of voice biometric data comprising the steps of:
receiving, by an electronic device, voice biometric data of a user captured while the user was speaking;

analyzing the context in which the received voice biometric data was captured, wherein the context includes environmental and situational factors;

analyzing characteristics of the received voice biometric data to detect anomalies associated with synthetic speech, wherein anomalies are noncorrelations with characteristics of voice biometric data expected under the environmental and situational factors;

in response to determining the received voice biometric data is free of anomalies, conducting a biometric authentication transaction based on the voice biometric data;

in response to successfully authenticating the user, updating record voice biometric data of the user with the received voice biometric data;

modifying the updated record voice biometric data; and securely storing the modified updated record voice biometric data.

2. The method according to claim 1, said securely storing step comprising:

calculating a cryptographic hash for the modified updated voice biometric data to uniquely identify the modified updated voice biometric data and prevent unauthorized alterations; and recording the modified updated voice biometric data in a tamper-proof ledger using blockchain technology.

3. The method according to claim 1, further comprising:

updating an anomaly detection algorithm used to carry out said analyzing characteristics of the received voice biometric data step; and updating a voice biometric data updating algorithm.

4. The method according to claim 1, wherein the characteristics comprise:

range of pitch;

timbre;

intensity;

prosody; and pace, rhythm, and nature of speech.

5. The method according to claim 1, further comprising:

receiving additional authentication data associated with the user;

analyzing characteristics of the additional authentication data to detect anomalies associated with synthetic speech; and in response to determining the received voice biometric data is free of anomalies, conducting an authentication transaction based on the additional authentication data.

6. The method according to claim 1, said modifying the updated voice biometric data step comprising:

altering the frequency modulation of the updated voice biometric data;

randomly altering inflection points and words in the updated voice biometric data; and intermittingly introducing background noise, wherein the background noise varies in type and intensity.

7. The method according to claim 1, further comprising the step of developing adaptive thresholds for determining authenticity of the received voice data based on the context in which the received voice biometric data was captured and record data of the user.

8. An electronic device for enhancing the security of voice biometric data comprising:

a processor; and a memory configured to store data, said electronic device being associated with a network and said memory being in communication with said processor and having instructions stored thereon which, when read and executed by said processor, cause said electronic device to:

receive voice biometric data of a user captured while the user was speaking;

analyze the context in which the received voice biometric data was captured, wherein the context includes environmental and situational factors;

analyze characteristics of the received voice biometric data to detect anomalies associated with synthetic speech, wherein anomalies are noncorrelations with characteristics of voice biometric data expected under the environmental and situational factors;

in response to determining the received voice biometric data is free of anomalies, conduct a biometric authentication transaction based on the voice biometric data;

in response to successfully authenticating the user, update record voice biometric data of the user with the received voice biometric data;

modify the updated record voice biometric data; and securely store the updated record voice biometric data.

9. The electronic device according to claim 8, wherein the instructions when read and executed by said processor, cause said electronic device to:

calculate a cryptographic hash for the modified updated voice biometric data to uniquely identify the modified updated voice biometric data and prevent unauthorized alterations; and record the modified updated voice biometric data in a tamper-proof ledger using blockchain technology.

10. The electronic device according to claim 8, wherein the instructions when read and executed by said processor, cause said electronic device to:

update an anomaly detection algorithm used to analyze characteristics of the received voice biometric data; and update a voice biometric data updating algorithm.

11. The electronic device according to claim 8, wherein the characteristics comprise:

range of pitch;

timbre;

intensity;

prosody; and pace, rhythm, and nature of speech.

12. The electronic device according to claim 8, wherein the instructions when read and executed by said processor, further cause said electronic device to:

receive additional authentication data associated with the user;

analyze characteristics of the additional authentication data to detect anomalies associated with synthetic speech; and in response to determining the received voice biometric data is free of anomalies, conduct an authentication transaction based on the additional authentication data.

13. The electronic device according to claim 8, wherein the instructions when read and executed by said processor, further cause said electronic device to:

alter the frequency modulation of the updated voice biometric data;

randomly alter inflection points and words in the updated voice biometric data; and intermittingly introduce background noise, wherein the background noise varies in type and intensity.

14. The electronic device according to claim 8, wherein the instructions when read and executed by said processor, further cause said electronic device to develop adaptive thresholds for determining authenticity of the received voice data based on the context in which the received voice biometric data was captured and record data of the user.

15. A non-transitory computer-readable recording medium in an electronic device for enhancing the security of voice biometric data, the non-transitory computer-readable recording medium storing instructions which when executed by a hardware processor cause the non-transitory recording medium to perform steps comprising:

receiving voice biometric data of a user captured while the user was speaking;

analyzing the context in which the received voice biometric data was captured, wherein the context includes environmental and situational factors;

analyzing characteristics of the received voice biometric data to detect anomalies associated with synthetic speech, wherein anomalies are noncorrelations with characteristics of voice biometric data expected under the environmental and situational factors;

in response to determining the received voice biometric data is free of anomalies, conducting a biometric authentication transaction based on the voice biometric data;

in response to successfully authenticating the user, updating record voice biometric data of the user with the received voice biometric data;

modifying the updated record voice biometric data; and securely storing the updated record voice biometric data.

16. The non-transitory computer-readable recording medium according to claim 15, wherein the instructions when read and executed by said processor, cause said non-transitory computer-readable recording medium to perform the steps of:

calculating a cryptographic hash for the modified updated voice biometric data to uniquely identify the modified updated voice biometric data and prevent unauthorized alterations; and recording the modified updated voice biometric data in a tamper-proof ledger using blockchain technology.

17. The non-transitory computer-readable recording medium according to claim 15, wherein the instructions when read and executed by said processor, cause said non-transitory computer-readable recording medium to perform the steps of:

updating an anomaly detection algorithm used to carry out said analyzing characteristics of the received voice biometric data step; and updating a voice biometric data updating algorithm.

18. The non-transitory computer-readable recording medium according to claim 15, wherein the characteristics comprise:

range of pitch;

timbre;

intensity;

prosody; and pace, rhythm, and nature of speech.

19. The non-transitory computer-readable recording medium according to claim 15, wherein the instructions when read and executed by said processor, cause said non-transitory computer-readable recording medium to perform the steps of:

receiving additional authentication data associated with the user;

analyzing characteristics of the additional authentication data to detect anomalies associated with synthetic speech; and in response to determining the received voice biometric data is free of anomalies, conducting an authentication transaction based on the additional authentication data.

20. The non-transitory computer-readable recording medium according to claim 15, wherein the instructions when read and executed by said processor, cause said non-transitory computer-readable recording medium to perform the steps of:

altering the frequency modulation of the updated voice biometric data;

randomly altering inflection points and words in the updated voice biometric data; and intermittently introducing background noise, wherein the background noise varies in type and intensity.

\* \* \* \* \*